(12) United States Patent
Pomp et al.

(10) Patent No.: US 11,417,161 B2
(45) Date of Patent: Aug. 16, 2022

(54) METHOD FOR OPERATING A SERVICE APPLICATION INSTALLED ON A MOBILE TERMINAL

(71) Applicant: Scheidt & Bachmann USA, Inc., Lowell, MA (US)

(72) Inventors: Georg Pomp, Mönchengladbach (DE); Norbert Miller, Mönchengladbach (DE)

(73) Assignee: Scheidt & Bachmann USA, Inc., Lowell, MA (US)

(*) Notice: Subject to any disclaimer, the term of this patent is extended or adjusted under 35 U.S.C. 154(b) by 214 days.

(21) Appl. No.: 16/774,295

(22) Filed: Jan. 28, 2020

(65) Prior Publication Data
US 2021/0233339 A1    Jul. 29, 2021

(51) Int. Cl.
*H04W 4/80* (2018.01)
*G07C 9/20* (2020.01)
*H04W 4/021* (2018.01)

(52) U.S. Cl.
CPC .............. *G07C 9/20* (2020.01); *H04W 4/021* (2013.01); *H04W 4/80* (2018.02); *G06Q 2240/00* (2013.01)

(58) Field of Classification Search
CPC ..... H04W 4/80; H04W 4/021; G06Q 2240/00
USPC .......................................................... 705/13
See application file for complete search history.

(56) References Cited

U.S. PATENT DOCUMENTS

| | | | | |
|---|---|---|---|---|
| 8,745,191 B2* | 6/2014 | Raleigh | ................. | H04W 12/08 455/414.1 |
| 9,557,889 B2* | 1/2017 | Raleigh | ................. | H04M 15/46 |
| 10,200,541 B2* | 2/2019 | Raleigh | ................. | H04M 15/83 |
| 10,798,252 B2* | 10/2020 | Raleigh | ................. | H04M 15/83 |
| 2013/0132854 A1* | 5/2013 | Raleigh | ................. | H04M 15/77 715/738 |
| 2013/0268357 A1* | 10/2013 | Heath | ................... | G06Q 10/10 726/26 |

(Continued)

FOREIGN PATENT DOCUMENTS

EP    3 388 992 A1    10/2018

OTHER PUBLICATIONS

Office Action, Application no. 10 2019 129 631.5, dated Sep. 9, 2020, 5 pages (*in German*).

(Continued)

*Primary Examiner* — April G Gonzales
(74) *Attorney, Agent, or Firm* — Sunstein LLP

(57) ABSTRACT

A method for operating a service application (100, 200.1, 200.2) installed on a mobile terminal (102, 202.1, 202.2) for the use of a service, in particular a transport service, comprising obtaining, through a reception module (104) of the service application (100, 200.1, 200.2), at least one usage data set, determining in a basic usage state of the service application (100, 200.1, 200.2), by a verification module (106) of the service application (100, 200.1, 200.2) a verified usage state based on the at least one obtained usage data set and at least one predetermined verification reference criterion, and, if a verified usage state has been determined, effecting, by a first transmitting module (108) of the service application (100, 200.1, 200.2), transmitting, through the mobile terminal (102, 202.1, 202.2), an advertising signal with an advertising message, the advertising message indicating that the service application has determined a verified usage state.

25 Claims, 9 Drawing Sheets

(56) References Cited

U.S. PATENT DOCUMENTS

2017/0201850 A1* 7/2017 Raleigh .................. H04W 4/50
2018/0211188 A1* 7/2018 Bergdale ................ G07B 15/02
2019/0182749 A1* 6/2019 Breaux ................ H04W 4/027
2019/0303970 A1* 10/2019 DeWitt .............. G06Q 20/3224

OTHER PUBLICATIONS

European Patent Office Search Report, Application No. EP 20 20 2307, dated Nov. 26, 2020, 2 pages (*in German*).
Office Action, Application No. 3,097,555, dated Oct. 28, 2021, 6 pages.

\* cited by examiner

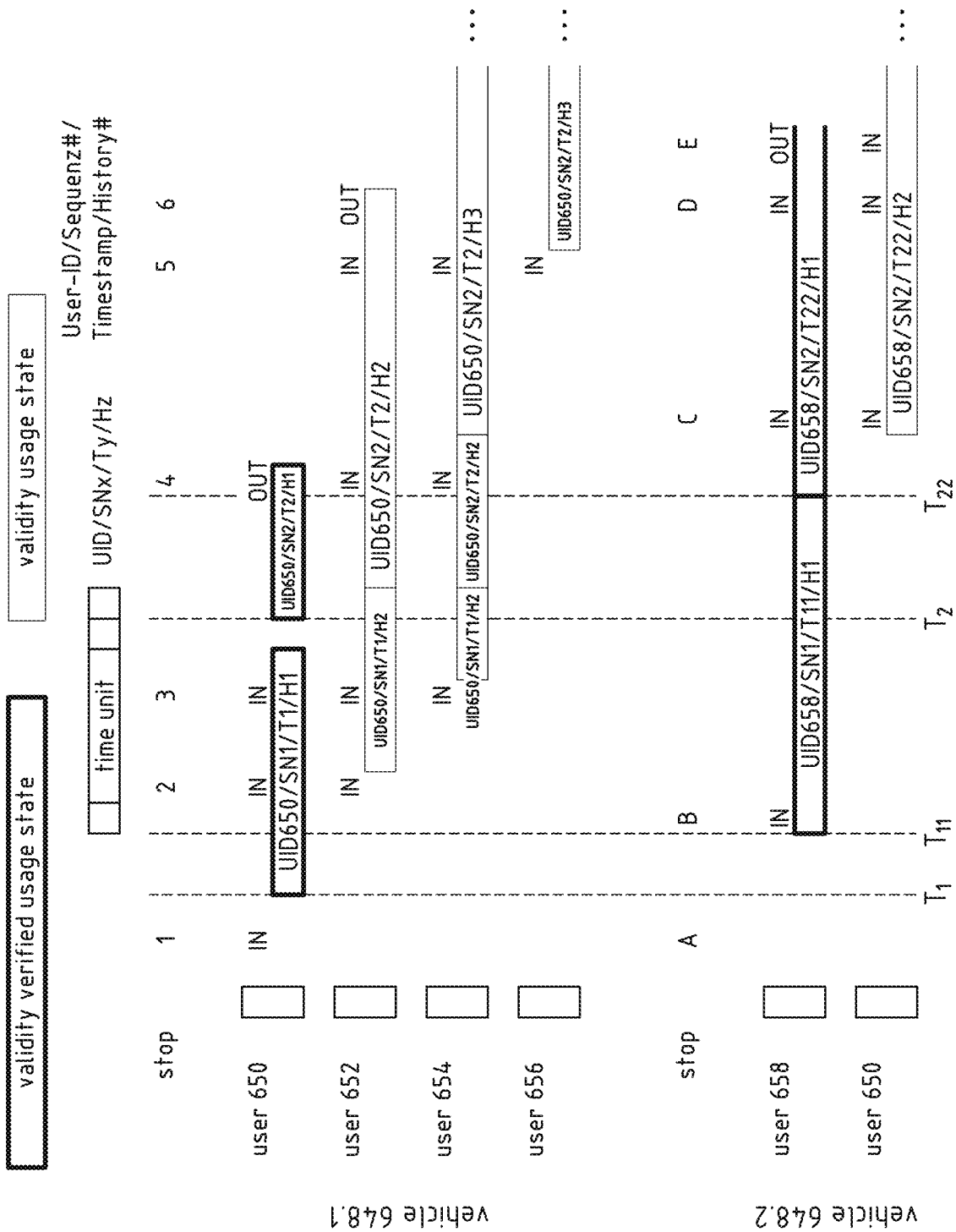

METHOD FOR OPERATING A SERVICE APPLICATION INSTALLED ON A MOBILE TERMINAL

TECHNICAL FIELD

The application relates to a method for operating a service application installed on a mobile terminal of a user for the use of a service, in particular a transport service. In addition, the application relates to a service application, a mobile terminal and a service system.

BACKGROUND ART

A user authorization may be required for the use of a specific service by a user. In the present case, such a service comprises in particular a transport service, for example the use of a transport device, in particular a vehicle (e.g. bus, train, plane, watercraft, etc.), but also other services, such as a participation in a specific event (e.g. concert, theatre performance, sports event, etc.).

In the case of service systems, for example in the form of a transport system, in order to acquire a user authorization for the use of a transport service in a conventional manner, a user can, typically before use, obtain the user authorization, for example by purchasing a ticket. Exemplary and non-exhaustive user authorizations for transport systems are single or multiple tickets, as well as time-based tickets, such as daily, weekly or monthly passes.

Today, more and more service systems are used for transport services, but also for the above-mentioned event services, in which electronic user authorizations are acquired and provided. For this purpose, a user authorization in the form of an electronic ticket can be transferred to a mobile terminal of the user. This can then be presented by the user at an access control, e.g. at a passage barrier, and/or checked by an inspector, e.g. using a mobile inspection device.

For example, a stored electronic ticket can be displayed by a graphic display module on the mobile terminal in the form of an optical code (e.g. barcode or QR code) that can be read wirelessly by the inspection device. The ticket can also be stored in a data memory of the mobile terminal and can be readable via radio communication (e.g. Bluetooth, Wibree, WiMAX, ZigBee, WiFi or NFC). In particular, this allows a ticket data set to be read and, by the inspection device, compared with admissible reference ticket data sets to determine whether the user is entitled to use a current transport service (for example, does the read ticket data entitle the user to use the present transport device in the present class?). However, the read process and the comparison of the data take a considerable amount of time and also reduce the user comfort.

Furthermore, "ticketless" transport systems are known from the state of the art, also known as occupancy recording systems, in which the use of a transport service is detected by suitable detecting means installed in the usable service area (e.g. a vehicle) and billed accordingly. In particular, with such a transport system the acquisition of the user authorization in the form of a ticket before use can be omitted. It is also possible for previously acquired travel authorizations to be used in occupancy recording systems and for the validity of these travel authorizations to be checked with regard to the used transport means, the travelled route or also the time of use.

As a rule, such a transport system requires the user to register with the system before using a transport service for the first time. Upon successful registration, a user account for the registered user is created in the transport system, in particular in a backend system of the transport system, by storing identification data, such as a unique user identifier (ID) of the user, authentication data, e.g. a password, and billing data, e.g. credit card data or bank account data, address data or other data for billing, in the backend system. These data are called user master data in their entirety. In addition, a service application in the form of an app is usually installed on the mobile terminal of the registered user.

For the legitimate use of a transport service, the registered users carries their mobile terminal with the service application (app), wherein the app is activated on the terminal and (typically when activated for the first time) is linked to the registered user; for this purpose, the users identify themselves with the identification data and authentication data stored in the user account. This means that the exactly one service application installed on the used terminal is assigned to the corresponding user account, and all services detected with this terminal are billed with the corresponding user account. The transport device to be used by the user comprises a detection device with a communication module for detecting the presence of the mobile terminal in the transport device. For example, presence messages can be exchanged between the mobile terminal and the detection device.

Such service systems require, in particular, that each transport device is equipped with at least one detection device and at least one communication module. As a rule, a plurality of detection devices is required. Since in particular the retrofitting of transport devices and similar service areas is associated with a high effort and corresponding costs, the mentioned service systems are developed further in accordance with the state of the art in such a way that they can do without detection and communication infrastructure in the service area, in which a user authorization is necessary for a presence.

In such service systems, the service application installed on the mobile terminal (in particular, a service application in the form of a software application executable by a processor of the mobile terminal) takes over the detection and recording and logging, respectively. In the case of a transport service this means, for example, the logging of the performed transport service, in particular the trip performed by a user, i.e. the use of several transport means (e.g. bus/train journeys with change processes).

Such a service application is in particular configured to detect whether the mobile terminal is in a service area where a user authorization is required. If it is detected that the mobile terminal is in a service area, the service application can be set to a basic usage state, also known as a "system be-in" state.

For example, in a so-called CIBO system (Check-In-Be-Out System), the service application can be prepared to assume the basic usage state by means of a manual check-in process (for example by actuating a user interface of the mobile terminal, such as a touch display): For this purpose, the manual check-in process initially sets the service application in a "system check-in" state. In the "system check-in" state, the service application assumes the basic usage state ("system-be-in") by automatically determining that predetermined basic usage reference criteria are fulfilled. The service application can regularly determine again whether the basic usage state is still present or whether the mobile terminal has exited from the mentioned service area (in particular the service area liable to pay). In this case, the service application can be set back into a non-usage state, also called a "system-be-out" state.

In order to record the use of the service, in particular for billing purposes, and/or to detect an exiting from the service area, it is known from the state of the art that the service application receives at least one usage data set (almost continuously) and evaluates it (almost continuously). In particular, a plurality of usage data sets can be provided to the service application by sensor elements of the mobile terminal, such as position data (e.g. GPS data, mobile radio data, acceleration and/or speed data, etc.).

The service application can evaluate the at least one received sensor data set, for example by comparing the at least one sensor date with a related and predetermined basic usage reference criterion. If the at least one sensor date (e.g. GPS coordinates) meets the associated basic usage reference criterion (e.g. specific area delimited by GPS coordinates), the service application of the terminal assumes that the user is still in the service area. Otherwise, it is assumed that the mobile terminal and thus the user have exited from the service area.

The problem with the known service systems without a detection device in the service area is that they cannot yet be operated with sufficient reliability. Practical tests have shown that the evaluation of sensor data can lead to incorrect results. In particular in geographical areas (e.g. underground areas such as tunnels, underground stations or the like), in where it is (temporarily) not possible to determine a position with at least one position sensor and/or where mobile radio signals (with sufficient signal level) are (temporarily) not present due to insufficient network coverage, incorrect evaluation results repeatedly occur. For example, the service application detects an exiting from the service area (although the user is still in the service area) and/or the service application generates a usage log which is not sufficiently accurate for billing and in particular does not allow an exact reconstruction of a trip.

Therefore, the object of the application is to provide a method for operating a service application installed on a mobile terminal for the use of a service, in particular a transport service, which increases the reliability of operation and, in particular, enables a detection of a change in the usage state, e.g. entering/exiting a service area, in a secure manner.

SUMMARY OF THE INVENTION

The object is solved according to a first aspect of the application by a method for operating a service application installed on a mobile terminal for the use of a service, in particular a transport service. The method comprises:
- receiving, by a receiving module of the service application, at least one usage data set,
- determining, in a basic usage state of the service application, by a verification module of the service application, a verified usage state based on the at least one received usage data set and at least one predetermined verification reference criterion, and
- if a verified usage state has been determined, causing, by a first transmitting module of the service application, a transmitting, by the mobile terminal, of an advertising signal with an advertising message, wherein the advertising message indicates that the service application has determined a verified usage state.

Contrary to the state of the art, by providing, according to the application, a method in which the mobile terminal actively transmits an advertising signal as soon as the installed service application verifies with sufficient certainty that the mobile terminal is (actually) in a service area, i.e. that a verified usage state has been determined, the reliability of the operation is significantly increased. In particular, the transmitted advertising signal can be received by further mobile terminals within range of the advertising signal and taken into account by these further mobile terminals, at least in the detection of whether they are in a service area (or not). Also if, for example, no geographical position data is received (currently) and/or (currently) no mobile radio signal is present at a mobile radio interface of a further mobile terminal, an advertising signal received from a first mobile terminal can be used in a sufficiently secure manner to determine whether the further mobile terminal is (or is not) located in a service area.

The method according to the application may be used in particular in a service system, preferably in the form of a transport system. The service system can be operated according to the BIBO methodology (so-called Be-In-Be-Out methodology), CIBO procedure (so-called Check-In-Be-Out methodology) and/or CICO procedure (Check-In-Check-Out methodology). The service system may comprise at least one service area without a proprietary detection device (or only with a detection device with limited functionality).

In particular, a service area is a limited area (e.g. a mobile, limited area), wherein a user authorization (in particular a registered and activated service application) is required for an admissible presence in this area. In particular, the service area can be a transport device, such as a transport vehicle (e.g. bus, train, aircraft, watercraft, etc.). However, a service area can also be a stationary area, such as a delimited transport station, such as an underground station, tram station, airport, port, etc., or a delimited event area, such as a concert hall, a football stadium, etc.

The method according to the application serves in particular to operate a service application, which can preferably be installed on a mobile terminal in the form of a software application (also known as an "app"). In particular, the software application may include computer code that can be executed by a processor of the mobile terminal. The service application is required in particular for the proper use of a service, in particular for logging the used service.

The (activated) service application can receive at least one usage data set. In particular, the mobile terminal can provide to a receiving module (in particular a software module) at least one usage data set. According to the application, a usage data set contains, in particular, information and an indication, respectively, that can enable the service application to determine whether the mobile terminal is (still) in a service area or not. Preferably, at least one receiving module can (almost continuously) receive a plurality of (different) usage data sets.

The at least one usage data set can be further processed by a verification module (in particular a software module) of the service application. In particular, the verification module can be executed in a basic usage state of the service application. The service application is in a basic usage state in particular when it has already been determined (by a detection module of the service application) that the mobile terminal is in a service area at least with a first reliability level.

According to the application, at least one verification reference criterion is predetermined, for example, stored in a data memory of the mobile terminal. Preferably, different and associated verification reference criteria may be provided for different usage data, for example in the form of at least one verification reference profile. A plurality of verification reference profiles may be provided, taking into account, for example, that a first condition for a first usage date may be lower if a further higher condition is simultaneously met by a further usage date (and vice versa).

In particular, the at least one verification reference criterion represents a condition in which it is determined with a second reliability level that the mobile terminal is located in a service area, wherein the second reliability level is higher than the first reliability level. In particular, this means that exceeding a first threshold value X by the values of the usage data is sufficient to set the service application to the basic usage state, while reaching a (higher) second threshold value Y is required for the verified usage state in order to set the service application to the verified usage state.

The at least one predetermined verification reference criterion is selected such that a verified usage state is only given if it is determined that the at least one received usage data set fulfils the verification reference criterion.

If a verified usage state is determined by the verification module, then the service application can be set to this verified usage state and, in particular, corresponding information can be provided to the first transmitting module. In the case of a verified usage state, a transmitting of an advertising signal is performed in accordance with the application by the mobile terminal. In particular, the first transmitting module can in particular control a short-range interface of the mobile terminal in such a way that an advertising signal is transmitted. In particular, the advertising signal can preferably be transmitted (almost) continuously, for example every x seconds, provided that a verified usage state is still detected.

Presently, an advertising signal is to be understood, in particular, as a signal having digital data content which can be transmitted by a first mobile terminal and can be received by at least one further mobile terminal and the digital data content of which can be evaluated, in particular by the at least one further mobile terminal, without a (permanent) coupling between said devices being necessary. In particular, an advertising signal can preferably be transmitted at regular intervals on at least one of, for example, a plurality of advertising channels of a particular transmission technology.

In the prior art, advertising signals are used to establish a permanent communication link between two mobile terminals. In particular, an advertising signal is used for the first contact between the terminals, in particular to indicate the presence and basic readiness of a terminal for coupling to a further (possibly within range located) terminal. After establishing the first contact, it is then switched to another channel with a higher data rate if a permanent communication connection is desired. The data is then not exchanged via advertising signals.

According to the application, it has been recognized that an advertising signal can be used advantageously for the transmission of an advertising message, since such a signal can always be received by a further mobile terminal and its data content can be evaluated (if the corresponding interface of the other mobile terminal is activated). This makes it easy to ensure that at least one further mobile terminal (in range) can be informed that it is (currently) in a service area.

In particular, it is provided in accordance with the application that an active transmitting of an advertising signal according to the application is only carried out by a mobile terminal if it is determined by the service application that the mobile terminal is (still) located in the service area with a specified sufficient level of security (in particular said second reliability level).

For example, the advertising message may contain an advertising data set that contains at least one piece of information/indication (e.g. a corresponding usage data set) indicating that the service application that caused the transmission is in a verified usage state (i.e. it is sufficiently certain that the mobile terminal is in a service area).

According to a first preferred embodiment of the method according to the application, the advertising signal may be a Bluetooth Low Energy (BLE) signal. In particular, a BLE advertising signal can be received and evaluated from almost any mobile terminal, in particular with a standard operating system (e.g. Apple iOS, Google Android, Microsoft Windows Mobile, Microsoft Mobile Phone, Blackberry OS, Symbian OS, Firefox OS, Tizen, Aliyun OS). In addition, the Bluetooth technology has the advantage that the range (e.g. to approx. 10 m) is limited, so that with a high degree of security an advertising signal is only received by mobile terminals that are also located in the service area.

In other variants of the application, at least one advertising signal can also be a WiFi advertising signal, RFID advertising signal or the like. It goes without saying that in one variant, two or more different advertising signals can also be transmitted by one mobile terminal.

According to a further embodiment of the method according to the application, the advertising message (in particular a BLE advertising signal) may include at least one of the following advertising data:
- at least one user identifier,
- at least one service provider identifier,
- at least one time stamp,
- at least one sequence number,
- at least one historical date of the advertising signal,
- at least one sensor flag, characterizing at least one sensor element of the mobile terminal that transmits the advertising signal,
- usage information verified by a backend system and/or an inspection device.

In particular, a user identifier can be uniquely (one by one) assigned (directly or indirectly) to a (registered) user of the service application of the mobile terminal (system-wide). Exemplary and non-exhaustive user identifiers are a (numeric or alphanumeric) user ID, user name, contract number of the user, identifier of the mobile terminal (e.g. IMEI), product number of the service application, etc.

A service provider identifier is in particular uniquely assigned to the provider of the used service, such as a specific service in at least one service area. In other words, it could be an identifier that uniquely identifies the transport service provider.

In addition, the advertising message may preferably comprise at least one time stamp (e.g. calendar date and time). It is advantageous to have a start timestamp that indicates the first transmission of the advertising message. In the case of a forwarded advertising message (explained in more detail below), an original time stamp may be present, indicating the transmission time of the original (respectively: initial) advertising signal.

In addition, alternatively or preferably additionally at least one sequence number can be contained in the advertising message. In particular, a sequence number means a number of the transmitting mobile terminal that is incremented during every communication between the service application and the backend system (e.g. at defined, regular time intervals). This can, for example, be evaluated by a service application receiving the advertising message.

In addition, alternatively or preferably additionally at least one sensor flag for at least one sensor element of the mobile terminal transmitting the advertising signal may be contained in the advertising message. A sensor flag can in particular be an information/indication that indicates for a sensor element whether a specific detected sensor date (a sensor value) is above an associated sensor threshold value or not. This can be done in the advertising message in particular by setting or not setting a sensor flag (0 or 1). For example, the advertising message can contain at least one of the following sensor flags:

| | |
|---|---|
| GPS (or similar): | 0/1 |
| speed: | 0/1 |
| Bluetooth | 0/1 |
| WiFi | 0/1 |
| GSM (or similar) | 0/1 |
| acceleration | 0/1 |
| motion | 0/1 |
| advertising signal | 0/1 |

For example, if a GPS signal is present, a 1 can be set, and if no GPS signal can be measured, a 0. A further example is GSM signal level. If the measured GSM signal level exceeds a specific sensor threshold value, a 1 can be set, otherwise a 0. A 1 or a 0 can be set accordingly for the other sensor flags mentioned as examples.

Alternatively or additionally, the advertising message may contain usage information verified by a backend system and/or an inspection device. For example, a mobile terminal can exchange data with the backend system, at least partially controlled by the installed service application, at least during the use of the service and during the presence in a service area, respectively. For example, the backend system can transmit a message to a mobile terminal in which the presence of the mobile terminal in a service area is confirmed.

A mobile inspection device (of a ticket inspector) can also exchange data with the mobile terminal and in particular with the installed service application as part of an authorization check (e.g. ticket inspection), in particular to check the authorization of the user to use the service. Preferably, the inspection device can check the at least one generated usage log data set (explained in more detail below).

In the course of a communication during an inspection process, an inspection device can, for example, transmit a message to a mobile terminal confirming the presence of the mobile terminal in a service area (for example, after a positive inspection result). It may also be possible that the service application deduces on its own from a performed inspection that the mobile terminal is currently in a service area.

If such confirmed or verified user authorization information is available, it can be advantageously added to the transmitted data content (e.g. in the form of an advertising data set) of an advertising message.

According to a further embodiment of the method according to the application, the method may (further) comprise:
  detecting, by a detection module of the service application in a detection step, a presence of the mobile terminal in a service area, and
  setting the service application to the basic usage state if the presence of the mobile terminal in the service area is detected, wherein the detection step is performed in particular at specific times, in particular preferably on a regular basis.

The service application comprises at least one detection module (in particular a software module). The detection module is configured to detect the presence of the mobile terminal (on which the service application is installed) in a service area, for example based on received data, such as the aforementioned at least one usage data set.

For example, in the detection step, a check-in action (manually performed by a user of the mobile terminal) can be detected (at least for a CIBO and/or CICO procedure). For example, a user can activate the service application and, in particular, initiate a check-in process by activating a user interface (e.g. a touch display). The detection module can detect a corresponding input and can then in particular set the service application to the "check-in" state. Starting from the check-in state, the service application assumes the basic usage state "System-Be-In" without further user interaction, as soon as the values of the received usage data exceed the first threshold value X.

Preferably, the service application can monitor its own condition (almost continuously). In particular, the detection module can repeat a detection step at specific times, preferably regularly (e.g. every x sec.). In particular, during at least one new execution of the detection step, an evaluation of the at least one received usage data set can take place on the basis of a predetermined basic usage reference criterion. In particular, it can be checked whether the at least one usage date meets (or does not meet) the at least one predetermined basic usage reference criterion.

According to a preferred embodiment of the method according to the application, the received usage date can be at least one sensor date of the mobile terminal received from a sensor element of the mobile terminal. The evaluation of the at least one received sensor date may include a comparison of the at least one sensor date with an associated and specified basic reference data range as a basic usage reference criterion. The basic usage state can (only) be detected if the at least one received sensor date falls within the at least one associated basic reference data range.

In particular, a plurality of basic usage reference criteria may be specified in the form of at least one basic usage reference profile. Furthermore, a variety of sensor data can be provided. In the evaluation, it can be checked whether the provided (current) sensor data (values) fall within the at least one basic usage reference profile or not (according to the description about the verification reference profile).

In accordance with a preferred embodiment of the method according to the application, the detecting of the presence of the mobile terminal in the service area may comprise a receiving of at least one (previously described) advertising signal containing an advertising message transmitted by a further mobile terminal. In particular, the advertising message extracted from the advertising signal can be provided to the service application as a usage data set. The advertising message can (again) contain a number of further usage data sets, in particular in the form of the advertising parameters described.

The at least one usage data set can be evaluated by the service application, in particular the detection module and/or the verification module. In particular, the at least one contained usage data set can be taken into account in the (repetitively performed) detection step. This enables the service application to (reliably) determine the presence in a service area even if the received (own) sensor data (e.g. due to (currently) insufficient mobile network coverage and/or insufficient GPS (or Galileo or similar) coverage) do not allow a presence in a service area to be detected, because e.g. the at least one basic usage reference criterion, in particular the basic usage reference profile, is (currently) not fulfilled by the sensor data.

In accordance with a particularly preferred embodiment of the method according to the application, in the detection step a detecting of the presence of the mobile terminal in the service area can comprise an evaluating of the at least one received advertising signal (in particular the at least one received advertising message from a further mobile terminal) in that in particular at least one of the evaluation steps is carried out (in particular by the detection module) from the group comprising:

evaluating of the number of advertising signals received from the same further mobile terminal, evaluating of the number of advertising signals transmitted from different further mobile terminals, evaluating of the at least one time stamp of the at least one received advertising message, evaluating of the at least one sensor flag, evaluating of at least one usage information verified by a backend system and/or an inspection device.

In principle, the quality of the received advertising message can be evaluated during the evaluation in the detection step, in particular based on the data contained in the advertising message and/or further data available to the service application, in particular the at least one usage data set and the at least one basic usage reference criterion. The determined quality can be compared with at least one reference quality (as basic usage reference criterion or verification reference criterion) in the detection step.

Preferably, the number of advertising signals received from the same further mobile terminal can be evaluated (the content of the advertising messages may change). In particular, the user identifier and/or sequence number can be used, for example, to determine whether a received advertising message originates from a mobile terminal from which an advertising message was previously received (within a specified period of time). In particular, the more often an advertising signal is received from the same mobile terminal, the higher the quality of the received advertising message can be rated. For example, at least a minimum number (as a basic usage reference criterion or verification reference criterion) can be specified for the evaluation. The reason for the increased quality with increasing number of received advertising signals from the same transmitting mobile terminal is in particular the assumption that the transmitting mobile terminal, in particular its service application, regularly determines whether a verified usage state still exists. The more advertising signals received from the same transmitting mobile terminal, the more often the service application of the transmitting mobile terminal has successfully verified the verified usage state.

Alternatively, or preferably additionally, it can be evaluated whether a number of advertising signals are received from different mobile terminals. In particular, the user identifier and/or sequence number can be used to determine, for example, whether a received advertising message originates from the same mobile terminal from which an advertising message has already been received (within a specified period of time) or whether an advertising message originates from a further mobile terminal. In particular, the quality of the received advertising messages can be rated higher, the greater the number of different transmitting mobile terminals is (at least one threshold value (e.g. >2) can be specified (as a basic usage reference criterion or verification reference criterion) for the required number of different transmitting mobile terminals for evaluation). The reason for this is that it can be assumed that the more service applications conclude that they are each in a verified usage state, the higher the probability that the respective determination result is correct.

Alternatively or preferably additionally, the at least one time stamp can be evaluated, in particular the original time stamp of a forwarded advertising message. In particular, the more up-to-date the received advertising message is, measured against the original time stamp, the higher the quality can be rated. In the case of an older advertising message, the quality may be lower, as it is not unlikely that the state of the transmitting mobile terminal has changed in the meantime.

Also at least one sensor flag can be evaluated. In particular, the at least one sensor flag can be used to determine whether at least one sensor date of the mobile terminal transmitting the advertising message is above a corresponding sensor threshold value. In particular, the more sensor flags in the message have the value 1, the higher the quality of the received advertising messages can be rated.

In addition, at least one piece of usage information verified by a backend system and/or an inspection device can be evaluated. If such verified usage information is available, the advertising message can be rated with a high quality.

It goes without saying that preferably two or more of the above-mentioned evaluation steps can be carried out and, in particular, set in relation to each other. For example, while the quality of an advertising message may initially be rated low because the advertising message is the first advertising message received from a particular mobile terminal, usage information contained therein, verified by a backend system and/or inspection device (and having a current timestamp), may result in a high overall rating of the quality of the received advertising message.

The aforementioned evaluation steps can at least partially (also) be carried out in determining whether the service application is in a verified usage state by the verification module.

As already described, in an embodiment of the method according to the application, the received usage data set can be at least one sensor date (i.e. a sensor value) of the mobile terminal received from a sensor element of the mobile terminal. The at least one received sensor date can be:

a signal level of a mobile radio network detected at a mobile radio interface of the mobile terminal, and/or a geographical position detected by a position sensor of the mobile terminal, and/or a signal level of a near field detected at a near field interface of the mobile terminal, and/or an acceleration detected by an acceleration sensor of the mobile terminal, and/or a speed detected by a speed sensor of the mobile terminal.

Preferably, a plurality of the aforementioned sensor data can be provided (almost continuously) and evaluated (almost continuously) by the service application, in particular based on at least one associated basic usage reference criterion, in particular a basic usage reference profile, and/or at least one associated verification reference criterion, in particular a verification reference profile.

As an example, it can be checked whether a signal level of a received mobile network measured at at least one mobile radio interface (e.g. LTE interface) exceeds (or does not exceed) a first basic signal level threshold value and/or a first verification signal level threshold value, i.e. whether at least one basic usage reference criterion and/or at least one verification reference criterion is met (or not). For example, the verification signal level threshold may be higher than the base signal level threshold.

The further parameters can be checked accordingly. For example, it may be checked whether the detected geographical position is within a geographical base reference area and/or geographical verification reference area, where the geographical verification reference area may be smaller than the geographical base reference area.

In the case of a vehicle as a service area, a geographical reference area can indicate in particular the area covered by the vehicle (e.g. bus, rail vehicle, watercraft, etc.) according to a predetermined timetable.

If, for example, a measured speed and a periodically repeated acceleration pattern (in particular in the vertical direction) are measured for a specific period of time, it can be assumed that the user themselves is moving, in particular walking or running. This is an indication that the user has exited from a transport device.

It goes without saying that with other variants of the application, additional sensor elements of the mobile terminal can be used and their data evaluated. For example, an activated software application with readable content (or a gaming application or the like) may indicate that the user is in a service area and is reading (or playing or the like) the content of the software application. For example, a sensor such as the acceleration sensor can also detect vibrations of a transport vehicle and provide them to the service application.

According to a further embodiment of the method according to the application, at least one piece of verified usage information received by a further mobile terminal from a first mobile terminal may contain a usage period indicating how long the service application of the first mobile terminal has been in the basic usage state (without interruption). A verification reference criterion may be a predetermined minimum duration. Determining the verified usage state may comprise detecting an exceeding of the specified minimum duration by the usage period. In particular, it has been recognized that after a specific period of time during which it has always been repeatedly established by the service application that the mobile terminal is located in the service area, there is a sufficient likelihood that the mobile terminal is actually located in the service area. It can therefore be concluded that a verified usage state exists.

In particular, a timer can be started when a presence is detected for the first time in a service usage area. If it has been repeatedly detected that the mobile terminal is in the service area until a specified minimum time period expires, the service application can be set to the verified usage state (until, for example, it is detected that the mobile terminal is probably no longer in the service area).

According to a further embodiment of the method according to the application, the at least one received usage data set can be usage information verified by a backend system and/or usage information verified by an inspection device, as described above. The at least one verification reference criterion can be the existence of verified usage information. Determining the verified usage state may include detecting the presence of the verified usage information.

According to a further preferred embodiment of the method according to the application, the at least one received usage data set may be a sensor date (a sensor value) of the mobile terminal received from a sensor element of the mobile terminal, as previously described. The evaluating of the at least one received sensor date may comprise a comparing of the at least one sensor date with an associated and predetermined verification parameter range as a verification reference criterion (as already described as an example). The verified usage state can be detected if the received sensor date is within the verification parameter range.

According to a further preferred embodiment of the method according to the application, the method may (further) comprise:
  receiving a plurality of time-dependent sensor data comprising at least a mobile radio signal level and a position signal,
  wherein the evaluating comprises the detecting of a drop of the plurality of time-dependent sensor data to substantially zero, and
  the at least one verification reference criterion is a drop of the plurality of time-dependent sensor data to substantially zero.

In particular, it has been recognized that when a vehicle enters a tunnel or the like, at least the mobile radio signal level and a position signal (due to the lack of network coverage) are no longer present at the corresponding interfaces of the mobile terminal when it enters the tunnel or the like. In other words, a corresponding time sensor signal and sensor date, respectively, drops to zero. In particular, at least the at least one detected mobile signal level and the at least one detected position signal drop almost simultaneously to zero. Accordingly, such a signal characteristic can be evaluated as evidence that the corresponding mobile terminal is located in a service area, so that, in particular, a verified usage state can be determined by the verification module of the service application with a corresponding parameter profile.

According to a particularly preferred embodiment of the message according to the application, the method may (further) comprise:
  causing, by the first transmitting module, a transmitting of a further advertising signal with a further advertising message, upon receipt of a first advertising message,
  wherein the further advertising message is at least partly based on the first advertising message.

According to the application, it has in particular been recognized that, in order to distribute an advertising message carried by an advertising signal (usually limited in range), the receiving mobile terminal can at least forward the essential content of a received advertising message. This means that essentially all mobile terminals in a usage area can receive the advertising message transmitted by a service application in a verified usage state.

For example, the received advertising message can be forwarded completely and can be sent as a further advertising message. The received advertising message can also be supplemented with further data, such as the user identifier of the forwarding mobile terminal, a time stamp of the transmission of the further advertising message, a changed or additional sequence number and/or historical data, which represent the history of the sent advertising message.

In particular, it has been recognized in accordance with the application that a viral network can be formed as a result, which enables the forwarding of essential information for the use of a service without the installation of a dedicated detection and/or communication infrastructure being necessary in the service area.

As has already been described, it may be provided according to a further embodiment of the method according to the application that the determining of the verified usage state is carried out at specific times, in particular on a regular basis.

In particular, a regular reassessment of the usage state can be carried out, for example by executing one or more of the aforementioned evaluation steps.

Preferably, the verified usage state can be determined after a specified time interval has elapsed. If, for example, no signals are present or no sensor data are received that meet the at least one verification reference criterion, in particular profile, for a specific period of time (e.g. between 1 minute and 10 minutes), the verified usage state can be cancelled and, in particular, the transmitting of an advertising signal can be stopped.

Alternatively, or preferably additionally, if a sudden and in particular significant change in the framework conditions is detected, a new determination of the verified usage state can be carried out. If, for example, the number of mobile terminals transmitting an advertising signal drops sharply or a speed and/or acceleration sensor indicates that the user is walking for a specific period of time, a reassessment can be carried out.

A reassessment may also be carried out if a signal rated higher confirms that the mobile terminal is in a further area which is not a service area, such as a known beacon of a shopping center or the like.

In a further embodiment of the method in accordance with the application, it is provided that the method may also comprise causing, by the first transmitting module, the transmitting of a second advertising message with a usage termination data set if it is detected that the mobile terminal has exited from the service area. In particular, a "system-be-out" can then be transmitted and at least one further service application can be informed about the changed usage state of the transmitting mobile terminal, in particular of the corresponding service application.

According to a further embodiment of the method according to the application, the method may (further) comprise causing, by the first transmitting module, active transmitting of a request if, after an originally detected presence of the mobile terminal in a service area, it is determined upon re-detection that the at least one basic usage reference criterion is not met by the at least one received usage data set (before switching to the non-usage state).

In particular, it may occur that no mobile terminal with a service application is in a verified usage state in a service area, so that no active transmitting of an advertising signal takes place. However, the at least one respective service application may be in a basic usage state. If a further service application detects in a detection step that the at least one basic usage reference criterion is not fulfilled by the at least one received usage data set, a request can first be sent to actively request the usage states of the service applications within range. If a service application receives such a request, the first transmitting module can cause a response to be transmitted, including the (current) usage state.

Based on the received responses, in particular the received usage states, the requesting service application can determine whether the basic usage state exists (or not). For example, the detection module can determine a basic usage state if at least two responses are received from different service applications with a basic usage state. It goes without saying that even one answer may be sufficient or that three or more answers may be required.

According to a further embodiment of the method according to the application, the method may comprise:

generating, at least during the basic usage state, by a generating module of the service application, at least one usage log entry about the usage of the service, and causing, by a second transmitting module of the service application, a transmitting of a usage log message containing the at least one generated usage log entry to a backend system by the mobile terminal.

In particular, upon (initial) detection of a basic usage state until detection of a termination of the use of the service area, a usage log entry of the performed service can be generated. In particular, at least one received usage data set, in particular all received usage data sets, may be continuously recorded. In particular, each received advertising message and each transmitted advertising message can be recorded and logged in a usage log.

For example, at least the geographical position data (if available) can be recorded. The generation of the usage log serves in particular for a subsequent billing of the service used by the user by a backend system. It can also be used for inspection purposes.

A second transmitting module can, in particular, cause a transmitting of a usage log message containing the at least one generated usage log entry to a backend system (e.g. via a mobile radio network). A transmission of a usage log message may be caused at least after detection of a termination of the use of the service area. Preferably, a plurality of usage log messages may be transmitted until the termination of the use of the service area is detected (e.g. every x min), provided that a communication link with the backend system can be established. In case of a temporary communication interruption to the backend system, the at least one usage log entry can be stored in a data memory of the mobile terminal until a communication connection to the backend system can be established.

According to a further preferred embodiment of the method according to the application, the application may further comprise:

receiving, by at least one receiving module of the backend system, a plurality of usage log messages from a plurality of mobile terminals, determining, by at least one evaluation module of the backend system, a first trip for a first mobile terminal having a verified usage state, based on at least one first usage log message of the first mobile terminal, determining, by the at least one evaluation module of the backend system, a second trip for a second mobile terminal which has a non-verified usage state, based on at least one second usage log message of the second mobile terminal containing at least one second usage log entry, wherein the generating module of the service application of the second mobile terminal generates the at least one second usage log entry only when the second mobile terminal has received at least one advertising message from the first mobile terminal.

As has already been described, each service application can, in particular, at least after detection of a termination of the use of the service area, cause transmitting of at least one usage log message in each case, in particular to enable the backend system to bill for the used service.

The backend system may, at least in the case of a transport system, have an evaluation module, configured to reconstruct a travelled distance and trip, respectively. A trip is in particular the distance travelled by a user with at least one transport device between a start station (i.e. the station where a user first enters a transport device) of a transport system and an end station of the transport system (i.e. the station where a user finally exits from a transport device, i.e. in particular does not change to a further transport device). Once the trip has been determined, the amount to be paid for the use of this transport service can be calculated in a conventional way (based on predetermined tariff data).

For a correct accounting, however, it is necessary that the travel route and trip, respectively, can be reliably reconstructed. It has been recognized in accordance with the application that the reliability of the reconstruction can be improved if the evaluation module of the backend system determines the travel route and trip, respectively, in particular the second trip for a second mobile user terminal in a non-verified usage state, based on at least one second usage log message of the second mobile terminal, wherein the generating module of the service application of the second mobile terminal only generates the second usage log entry when the second mobile terminal has received at least one advertising message from the first mobile terminal.

In other words, a second mobile terminal in a non-verified usage state receives at least one advertising message from a first mobile terminal in a verified usage state during a journey. The second mobile terminal now transmits at least one second usage log message to the backend system. This second usage log message contains, among other things, verified usage information from the at least one received advertising message. The evaluation module of the backend system can now evaluate the first and second mobile terminals as being together in one vehicle and in particular reconstruct the trip of the second mobile terminal on the basis of better evaluated data, although the second mobile terminal was in a non-verified usage state.

A further aspect of the application is a service application, in particular in the form of a software application executable by a processor of a mobile terminal, for installation on a mobile terminal. The service application comprises at least one receiving module, configured to receive at least one usage data set. The service application comprises at least one verification module configured to determine a verified usage state, in a basic usage state of the service application, based on the at least one received usage data set and at least one predetermined verification reference criterion. The service application comprises at least one first transmitting module configured to transmit, by the mobile terminal, an advertising signal with an advertising message if a verified usage state has been determined. The advertising message indicates (in particular to recipients) that the service application (causing the transmitting) has determined a verified usage state (and is in a corresponding status, respectively).

In particular, the service application is configured to carry out the method described above. In particular, a service application in accordance with the application can be operated in accordance with the method described above.

The service application is formed in particular in the form of a computer program. The computer program comprises software code that is adapted so that when the software code is executed by a processor of the mobile terminal, the method described above is carried out.

The computer program, in particular the instructions and program instructions, respectively, may be stored in a computer program product, in particular a program memory. For example, a program memory is a non-volatile memory such as a flash memory, a magnetic memory, an EEPROM memory (electrically erasable programmable read-only memory) and/or an optical memory.

In addition, a mobile terminal can have a main memory, for example a volatile or non-volatile memory, in particular a random access memory (RAM), such as a static RAM memory (SRAM), a dynamic RAM memory (DRAM), a ferroelectric RAM memory (FeRAM) and/or a magnetic RAM memory (MRAM). The processor of the mobile terminal can, for example, store intermediate results or similar in the main memory.

A still further aspect of the application is a mobile terminal, comprising at least one previously described service application installed on the mobile terminal. In particular, the at least one processor of the mobile terminal can execute the installed service application according to the method described above.

Exemplary and non-exhaustive mobile terminals are smartphones, tablet computers, mobile game consoles, laptops, netbooks, data glasses, smart watches and similar wearables. Alternatively, a mobile terminal may be a dedicated ticketing device designed exclusively for a ticketing application.

A still further aspect of the application is a service system, in particular a transport system, comprising at least one first (and preferably at least one second) previously described mobile terminal and at least one (previously described) backend system.

It should be noted that a verified usage state always comprises a basic usage state.

A previously described module, element, etc. can at least partially comprise hardware elements (e.g. processor, memory, etc.) and/or at least partially software elements (e.g. executable code).

The characteristics of the methods, service applications, mobile terminals and service systems can be freely combined with each other. In particular, features of the description and/or of the dependent claims, even with complete or partial circumvention of features of the independent claims, may be independently inventive in their own right or freely combined with each other.

There is now a plurality of possibilities to design and further develop the method according to the application, the service application according to the application, the mobile terminal according to the application and the service system according to the application. In this regard, reference is made on the one hand to the claims subordinate to the independent claims, and on the other hand to the description of embodiments in connection with the drawing.

BRIEF DESCRIPTION OF THE DRAWINGS

FIG. 6a is an exemplary signal characteristic according to an exemplary application in the scenario according to FIG. 6.

DETAILED DESCRIPTION OF SPECIFIC EMBODIMENTS

In the following, the same reference signs are used for the same elements.

Figure 1:
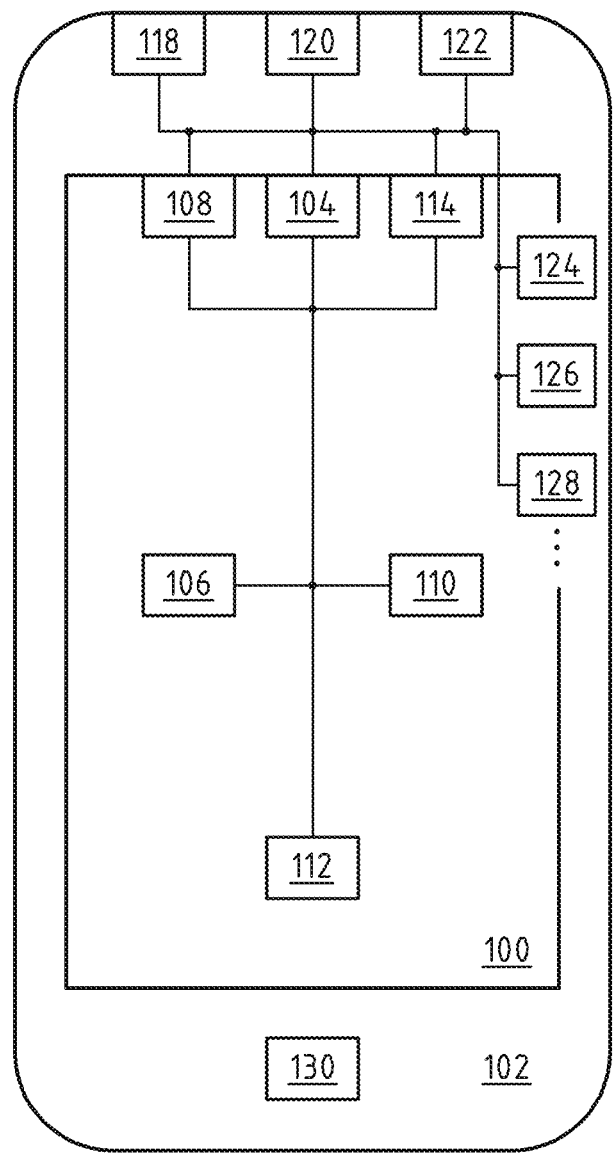
FIG. 1 is a schematic view of an embodiment of a mobile terminal according to the present application with an embodiment of a service application according to the present application.

FIG. 1 shows a schematic view of an embodiment of a mobile terminal 102 according to the present application with an embodiment of a service application 100 according to the present application.

As an example, the mobile terminal 102 can be a smartphone 102 on which the service application 100 (in particular after a conventional registration process of the user) is installed in the form of a software application 100. In particular, the software application 100 and the computer program 100, respectively, can be executed by a processor 130 of the mobile terminal 102.

The service application 100 may in particular be formed of a plurality of executable software modules 104 to 114. The service application 100 comprises at least one receiving module 104, configured to receive at least one usage data set. In particular, the at least one usage data set can be provided by interfaces/sensor elements 118 to 128 of the mobile terminal 102 to the receiving module 104 of the service application 100 for further processing by the service application 100.

In addition, the service application 100 comprises at least one verification module 106 configured to determine a verified usage state, in a basic usage state of the service application 100, based on the at least one received usage data set and at least one predetermined verification reference criterion. In particular, the receiving module 104 can provide the at least one received usage data set (preferably almost continuously) to the verification module 106 for further processing.

As can also be seen, the service application 100 comprises at least one first transmitting module 108, configured to transmit, by the mobile terminal 102, an advertising signal with an advertising message if a verified usage state has been determined. The advertising message is formed in such a way that a receiving service application running on a further (not shown) mobile terminal can recognize that the service application 100 (at least the service application originally causing the transmission) has determined a verified usage state and is in such a state, respectively.

If a verified usage state has not been determined and is not available, respectively, an (active) transmitting of an advertising signal with an advertising message is blocked by the mobile terminal 102.

Preferably, the service application 100 comprises at least one detection module 110. The detection module 110 is in particular configured to detect a presence of the mobile terminal 102 in a service area (not shown here) in a detection step. The detection module 110 can set the service application 100 to a basic usage state, based upon detection of a presence of the mobile terminal 102 in a service area, for example based on a detected check-in action (manually performed by a user of the mobile terminal 102) and/or on a determination that the at least one received usage data set fulfils at least one associated and predetermined basic usage reference criterion.

The detecting of the presence of the mobile terminal 102 in the service area may comprise in particular a receiving of at least one advertising signal with an advertising message transmitted by a further (not shown) mobile terminal.

As already described, the detection module 110 can (at least almost) continuously monitor the usage state of the service application, in particular to detect a user exiting from the service area.

Furthermore, the service application 100 preferably comprises a generating module 112, configured to generate at least one usage log entry at least during the basic usage state about the usage and use, respectively, of a specific service, in particular transport service. In particular, at least during the time that the service application 100 is in the basic usage state and/or the verified usage state, a plurality of data can be recorded and, in particular, logged. In particular, such data are logged that make it possible to reconstruct the usage history of a service, in particular a trip. For example, at least all received usage data sets can be recorded and a corresponding usage log entries can be generated. It goes without saying that a usage log entries can also be generated for a specific period of time after a detection that the mobile terminal 102 is no longer in a service area.

The service application 100 may preferably comprise at least one second transmitting module 114 configured to transmit, by the mobile terminal 102, of a usage log message containing the at least one generated usage log entry to a (not shown) backend system.

The at least one usage log entry can, for example, be temporarily stored and transmitted at least if it is detected that the mobile terminal 102 is no longer in a service area. It goes without saying that at least one usage log entry can remain stored until a communication connection can be established between the mobile terminal 102 and the remotely located backend system (e.g. formed by one or more (distributed) servers).

The mobile terminal 102 can comprise at least one first (near-field) interface 118, 120 and at least one first (near-field) communication element 118, 120, respectively, in order to at least transmit an advertising signal containing an advertising message, in particular in the case of an causing by the first transmitting module 108. Preferably, a first communication element 118, 120 may also be arranged to receive an advertising signal containing an advertising message. For example, the mobile terminal 102 comprises a Bluetooth interface 118 (e.g. antenna with antenna controller) and (optionally) a WiFi interface 120 (e.g. antenna with antenna controller).

Preferably the Bluetooth interface 118 can be used to transmit the advertising signal. In particular, the first transmitting module 108 can generate an advertising message to be sent and transfer it to the Bluetooth interface 118 for transmission. In particular, the Bluetooth interface 118 can be configured to generate and send a BLE advertising signal with an advertising message as described above.

For example, the BLE advertising signal can be formed as follows:

Universally Unique Identifier (UUID): 16 bytes

Unique Scheme Identifier—Part 1 (4 bytes): Unique identifier of the operator scheme (service provider identifier), which can be used by terminals as identification during the scan.

User ID (4 bytes) (user identifier): Assigned during the registration and validated during the check-in.

Time (2 bytes) (time stamp): Minutes since the start of the working day (configured in the configuration file)

Status (2 bytes) (e.g. verified usage state): Status Bits of the terminal

Signal Type (e.g. status) (4 bits)

Station Flag (1 bit)

Sensor flags (7 bits)

GPS (0/1)

speed (0/1)

BLE (0/1)

WiFi (0/1)

GSM (0/1)

motion detection (0/1)

user beacon (and advertising signal, respectively) (0/1)

Signal history (4 bits): Is incremented for the same User ID and sequence number. Enables the viral distribution of the same signal (identical user ID and sequence number). With a new timestamp, the history is set to "0".

Unique Scheme Identifier—Part 2 (4 bytes): Unique identifier of the operator scheme (service provider identifier), which can be used by terminals as identification during the scan.

Major and Minor: 4 Bytes

Sequence number (32 bits): sequence number of the event (incremented for each event)

In particular, the interfaces 118, 120 may further comprise or form a sensor element and in particular provide the receiving module 104 of the service application 100 with at least one respective usage data set, such as a sensor date (i.e.: sensor value, e.g. present (WiFi or Bluetooth) signal level), a received advertising message or a received identifier of a transmission field, e.g. from a transmitter (known to the mobile terminal 102 and the service application 100, respectively).

In addition, the mobile terminal 102 may comprise at least one mobile radio interface 122 and mobile radio communication element 122, respectively. The mobile radio interface 122 can be configured to communicate with the backend system, in particular to send the usage log message mentioned above. For example, the usage log message can be generated by the second transmitting module 114 and passed to the mobile radio interface 122 to cause a transmitting.

The at least one mobile radio interface 122 can comprise or form a sensor element and, in particular, provide the receiving module 104 of the service application 100 with at least one usage date, such as a sensor date (e.g. the present signal level of a received mobile radio field).

In this example, the mobile terminal 102 also comprises at least one position sensor 124, for example a GPS sensor 124. The position sensor 124 is in particular configured to receive at least one position signal (e.g. GPS signal). Based on the at least one position signal, a geographical position of the mobile terminal 102 can be determined, for example in the form of GPS coordinates or the like. In particular, the at least one position sensor can provide the receiving module 104 with a usage date, in particular in the form of a sensor date, such as a current specific geographical position and/or the signal level of the at least one receivable position signal.

As can be seen, a mobile terminal 102 can comprise a plurality of further sensor elements 126, 128, for example an acceleration sensor 126 and a speed sensor 128. The further mentioned sensor elements 126, 128 can also each provide the receiver module 104 with a usage date, in particular in the form of a detected sensor date, such as an acceleration date or a speed date.

It goes without saying that any further sensor elements of the mobile terminal that may be present can provide (further) detected sensor parameters to the receiving module.

The functionality of the service application 100 is explained in more detail below with the further figures.

Figure 2:
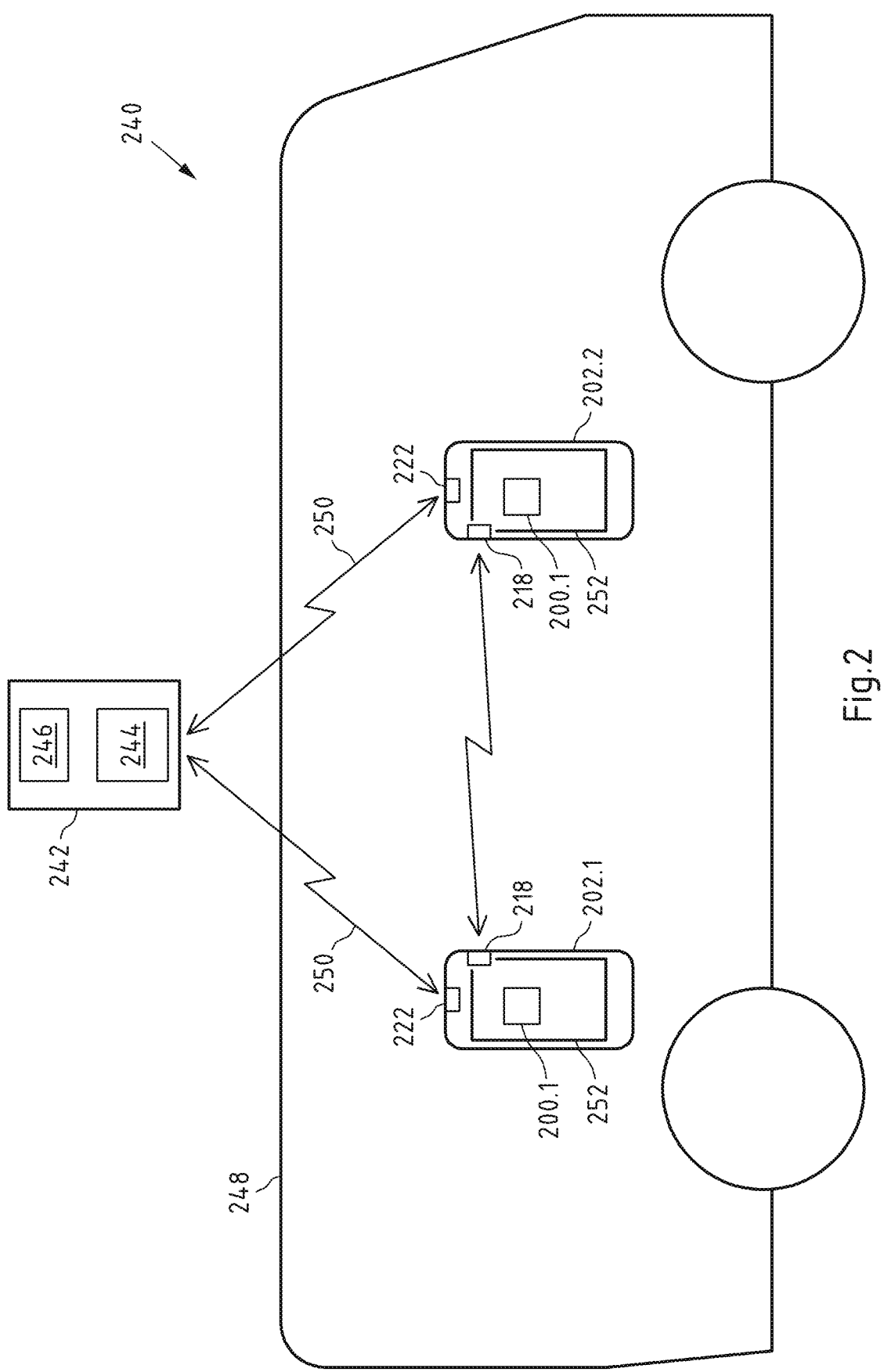
FIG. 2 is a schematic view of an embodiment of a service system in accordance with the present application.

FIG. 2 shows a schematic view of an embodiment of a service system 240 according to the present application. In this case, the service system 240 is a transport system 240 with at least one transport device 248 (in this case, only as an example, in the form of a bus 248). It goes without saying that a transport system can comprise a plurality of (different) transport devices.

The transport device 248 (in particular the interior of the transport device 248) forms the service area 248 in the present embodiment, i.e. the area 248 in which a user authorization for the presence of a user is required.

The transport system 240 comprises at least one backend system 242 (e.g. in the form of one or more (distributed) servers). The backend system 242 comprises at least one receiving module 244 (preferably a bidirectional communication module 244) and at least one evaluation module 246. It shall be understood that a backend system 242 may comprise further modules, such as a database for storing user accounts of registered users, a billing module for billing a conducted transport service, etc.

The receiving module 244 is in particular configured to receive a plurality of usage log messages from a plurality of mobile terminals 202.1, 202.2.

Two mobile terminals 202.1, 202.2, each having implemented a service application 200.1, 200.2, are shown as examples in this embodiment. The service application 200.1, 200.2 can in particular be formed essentially according to the service application according to FIG. 1 (in favor of a better overview, a presentation of the individual modules has been omitted). A mobile terminal 200.1, 200.2 can also be formed essentially according to the mobile terminal shown in FIG. 1 (in favor of a better overview, a plurality of the interfaces/sensor elements have not been shown). The service application 200.1, 200.2 can, for example, detect 252 user inputs from a user via a touch display, such as a check-in action.

As already described, in a verified usage state of a first service application 200.1, the service application 200.1 can cause a transmitting of an advertising message in the form of an advertising signal by a Bluetooth interface 218, in particular a BLE advertising signal. A second mobile terminal 202.2 in range can receive the BLE advertising signal and the second service application 200.2 installed thereon can evaluate the advertising message in order to at least detect whether or not the second mobile terminal 202.2 is in a service area 248. From the point of view of the second service application 200.2, the advertising message at least indicates that the first service application 200.1 is in the vicinity (namely within the transmission range of a BLE signal) and that this first service application 200.1 is in a verified usage state. From this, the second service application 200.2 can conclude that it is in the same usage state as the first service application 200.1. In addition, the second service application 200.2 can in particular forward the received advertising message.

The respective mobile radio interface 222 can transmit in particular usage log messages via a mobile radio network 250 to at least one receiving module 244 in the manner described above. The at least one received usage log message can be evaluated by the evaluation module 246 of the backend system 242, in particular to determine the trip covered by the transmitting mobile terminal 202.1, 202.2 (and its user, respectively).

In particular preferably, the evaluation module 246 may be configured to determine the trip from a second mobile terminal 200.2 based on the at least one second usage log message of the second mobile terminal 202.2, wherein the second mobile terminal 202.2 transmits the at least one second usage log message to the backend system 242 only when it has received at least one advertising message from the first mobile terminal 202.1 in a verified usage state.

Figure 3:
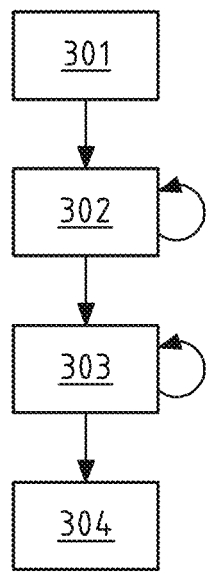
FIG. 3 is a diagram of an embodiment of a method according to the present application.

FIG. 3 shows a diagram of an embodiment of a method according to the present application for operating a service application (cf. e.g. FIG. 1) installed on a mobile terminal (cf. e.g. FIG. 1) for the use of a service, in particular a transport service (cf. e.g. FIG. 2).

In a first step 301, at least one usage data set is received by a receiving module of the service application. In the case of a service application operating according to the CIBO procedure, first information on the detection of a check-in action can in particular be obtained as a usage data set. Step 301 can preferably be performed almost continuously. In particular, a plurality of the aforementioned sensor data and/or received advertising messages can be provided almost continuously to the receiving module of the service application as usage data sets.

In detection step 302, a detection module of the service application first detects whether the mobile terminal is currently in a service area (or not). This step 302 can be performed repeatedly and almost continuously, respectively.

In particular, the at least one received usage data set can be compared with at least one predetermined and associated basic usage reference criterion (e.g.: presence of a detected check-in action (or not); fulfilment of a predetermined basic reference parameter range by a received sensor data set (i.e. sensor value) (or not); presence of an advertising message from a further mobile terminal (or not); and/or the like). In this step, in particular the quality of a received advertising message can be evaluated in the manner described above.

If the detection module determines that the mobile terminal and thus the user are in a service area with at least one first reliability level (corresponding to the at least one basic usage reference criterion), then the detection module can set the service application to a basic usage state.

When the service application is in the basic usage state, a step 303 is performed to determine, by a verification module of the service application, a verified usage state based on the at least one received usage data set and at least one predetermined verification reference criterion. This step 303 can be performed repeatedly and almost continuously, respectively.

In step 303 it is in particular checked whether the at least one verification reference criterion is fulfilled or not. For example, determining the verified usage state may comprise detecting that a specified minimum duration has been exceeded by the usage period (as described above). It can also be checked whether a received usage data set is usage information verified by a backend system and/or usage information verified by an inspection device. The received sensor data can also be checked and it can be determined whether they fall within a specified verification parameter range (or not). The sensor data, such as mobile signal level and position signal level, can also be used to determine whether a transport vehicle has driven into a tunnel or the like as described above.

It goes without saying that steps 302 and 303 can at least partially be performed in parallel. In addition, it goes without saying that if the verified usage state is determined, the service application is also automatically in a basic usage state.

In a step 304, a causing, by a first transmitting module of the service application, of a transmitting, by the mobile terminal of an advertising signal with an advertising message is conducted, if a verified usage state was determined in step 303. In particular, an advertising message is only transmitted if it has been determined that the mobile terminal is located in a service area with a second reliability level (corresponding to the at least one verification reference criterion). In particular, a periodic transmission of the advertising message can be conducted.

Figure 4:
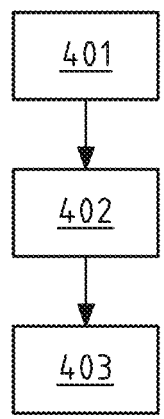
FIG. 4 is a diagram of a further embodiment of a method according to the present application.

FIG. 4 shows a diagram of a further embodiment of a method according to the present application.

In step 401, a generating module of a service application that is at least in a basic usage state can generate at least one usage log entry as described above.

In step 402, a second transmitting module of the service application may cause a transmitting, by the mobile terminal, of a usage log message containing the at least one generated usage log entry to a backend system as previously described.

The at least one received usage log message can be evaluated by an evaluation module of the backend system in step 403, in particular to determine the trip covered by the transmitting mobile terminal. In step 403, the evaluation module can be particularly preferably configured to determine the trip from a first mobile terminal based on the at least one second usage log message of the second mobile terminal, wherein the second mobile terminal transmits the at least one second usage log message to the backend system only when it has received at least one advertising message from a first mobile terminal in a verified usage state.

It shall be understood that the steps of the methods according to FIGS. 3 and 4 can at least partially be carried out in parallel and, in particular, the corresponding methods can be combined.

Figure 5:
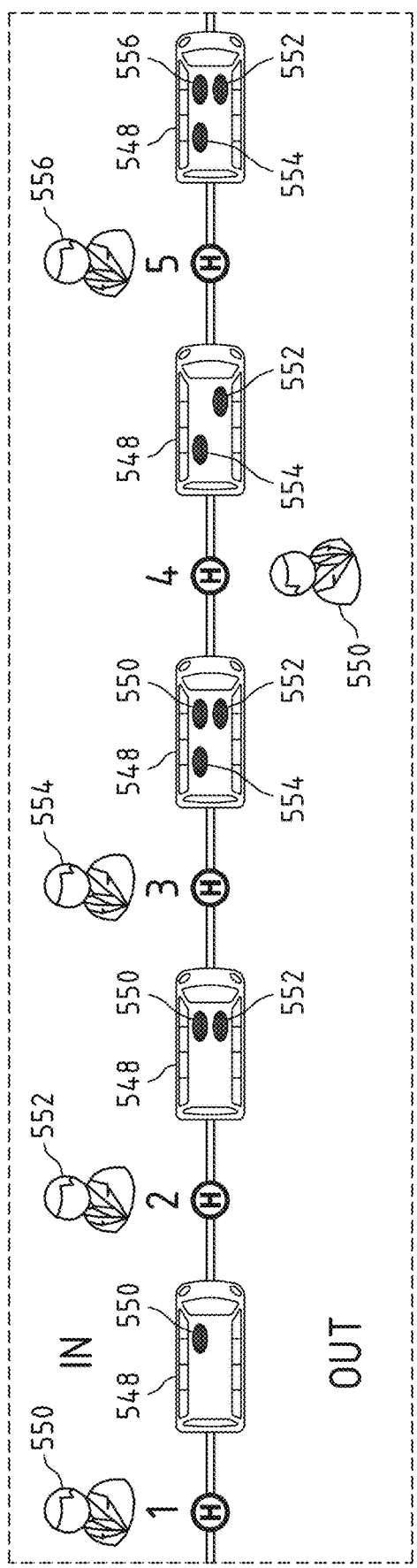
FIG. 5 is a schematic scenario of a transport service in which an embodiment of a method according to the present application is applicable.

FIG. 5 shows a schematic scenario of exemplary (partly only shown in extracts) trips, which are covered by users 550 to 556 at least partly with a transport device 548. The reference signs 1 to 5 indicate stops (H) at which users 550 to 556 enter (see upper half of the figure marked IN) and/or exit from the service area 548 (see lower half of the figure marked OUT).

Thus, at the first stop 1, a first user 550 enters into the vehicle 548 and exits from the vehicle 548 again at stop 4. At the second stop 2, a second user 552 enters into the vehicle and gets off at a (not shown) stop 6. At the third stop 3, a third user 554 enters. At the fifth stop 5, a fourth user 556 enters. In this exemplary scenario it is assumed that each user carries a (not shown) mobile terminal with a service application according to FIG. 1.

In the following, the method in accordance with the application and the advantages of the method in accordance with the application are described in more detail using Figures Sa to Sc, which show examples of applications of the method in accordance with the application. Figures Sa to Sc illustrate in particular the signal characteristics of transmitted advertising signals. The following framework conditions are used as an example: The validity period of the verified usage state is a maximum of N time units, e.g. 5 minutes. The period of time during which an advertising signal (also called user beacon) can be repeated, in particular periodically repeated, is identical to the validity period of the verified usage state. After each transmission of an advertising signal, the mobile terminal which is in a verified usage state (again) goes into a "listening" mode in order to possibly receive other signals.

An advertising message contains the following advertising parameters: A user ID (UID), a sequence number (SNx) (e.g. the unique Seq. # transmitted to the backend system under which the logged data was transmitted), a (previously described) time stamp (Ty) (e.g. minutes after the beginning of the operating day, which is taken over in the config file in each APP at login/check-in) and at least one historical parameter (Hz). It goes without saying that in other variants additional or different data may be contained.

Figure 5A:
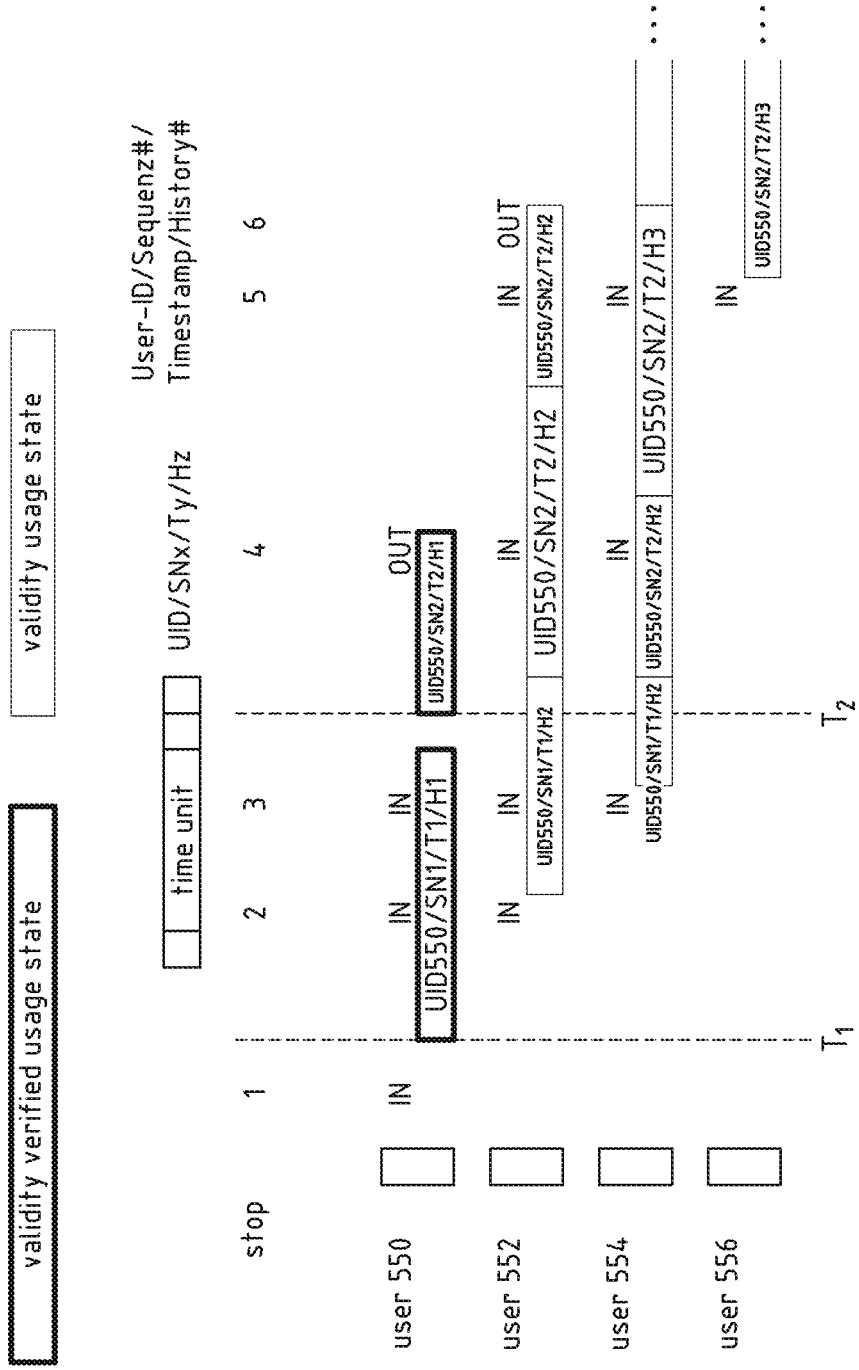
FIG. 5a is an exemplary signal characteristic according to an exemplary application in the scenario according to FIG. 5.

In the use case according to FIG. 5a, the service application of the mobile terminal of the first user 550 determines the verified usage state between stations 1 and 2 (as previously described). In other words, the mobile terminal of the first user 550 can become a "reference beacon" for other devices. The corresponding service application transmits a first advertising signal in the manner described above. The transmitted advertising message (UID550/SN1/T1/H1) is received by the mobile terminal of the second user 552, and the corresponding service application causes the advertising message (UID550/SN1/T1/H2) to be forwarded.

The first advertising message is also received by the mobile terminal of the third user 554 and the corresponding service application forwards the advertising message (UID550/SN1/T1/H2).

That the forwarded advertising messages (UID550/SN1/T1/H2) are each further forwarded messages can be seen from the historical parameters H2 (compared to H1 of the original advertising message). In particular, it becomes clear from the historical parameters for a recipient that it is a forwarded advertising message.

It can also be seen that between stations 3 and 4 the mobile terminal of the first user 550 transmits a further advertising message (UID550/SN2/T2/H1) with a changed sequence number SN2 (and a changed time stamp T2), for example due to a previously described event. In the manner described above, the receiving mobile terminals of the second and third users 552, 554 first forward the message (UID550/SN2/T2/H2).

Here, the terminal of the second user 552 transmits the forwarded advertising message (e.g. based, among other things, on an internal check of its own sensor parameters) even further, even if the first user 550 has already exited. The mobile terminal of the third user 554, on the other hand, only receives the advertising message (UID550/SN2/T2/H2) of the second user and forwards it as a message (UID550/SN2/T2/H3). The changed historical parameters H3 again show that this is an (multiple) forwarded advertising message.

The mobile terminal of the fourth user 556 receives the advertising message (UID550/SN2/T2/H2) from the second user 552 and forwards it (although the original transmitter 552 has already exited from the vehicle 548).

In particular, in the described application case, no other user 552, 554, 556 has a higher rated verified state than the first user 550, and the verified usage state of the first service application of the first user 550 can be passed on, even if the user 550 themselves and their service application, respectively, is no longer in the service area 548.

Figure 5B:
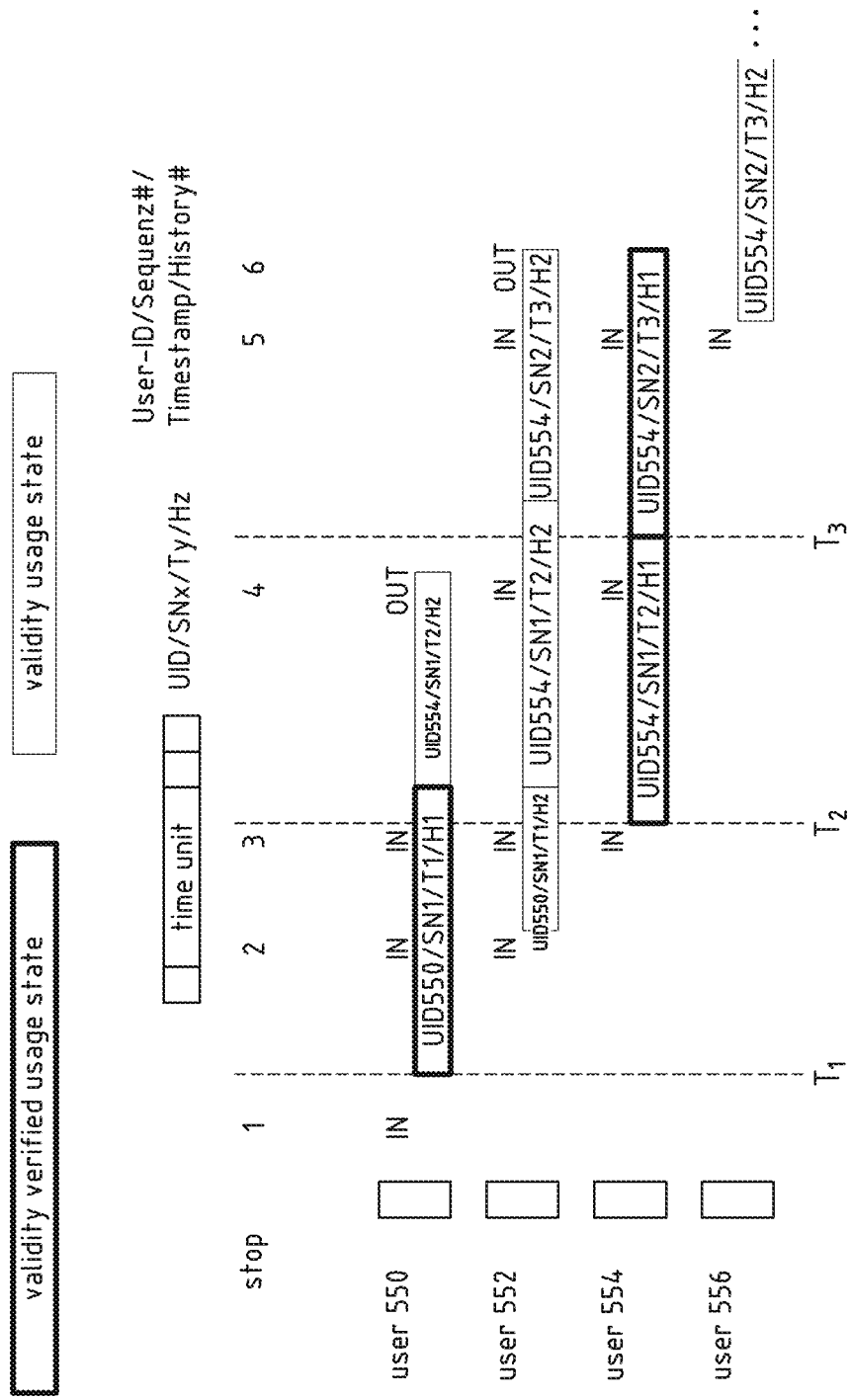
FIG. 5b is an exemplary further signal characteristic according to an exemplary further application in the scenario according to FIG. 5.

With regard to FIG. 5b, in order to avoid repetitions, essentially only the difference to the example in FIG. 5a is described.

The service application of the third mobile terminal of the third user 554 receives the advertising message (UID550/SN1/T1/H1) of the first user and evaluates it, for example based on its own sensor data. The third service application may also have, for example, usage information verified by a backend system and/or usage information verified by an inspection device.

The third service application comes to the conclusion in the evaluation that it can determine with a higher certainty (or higher reliability level) than the first service application that it is located in a service area. As a result, the third service application does not forward the received advertising message, but transmits its own (higher-value) advertising message (UID554/SN1/T2/H1). This is received by the further terminals in the manner described above and forwarded in particular as an advertising message (UID554/SN1/T2/H2).

Figure 5C:
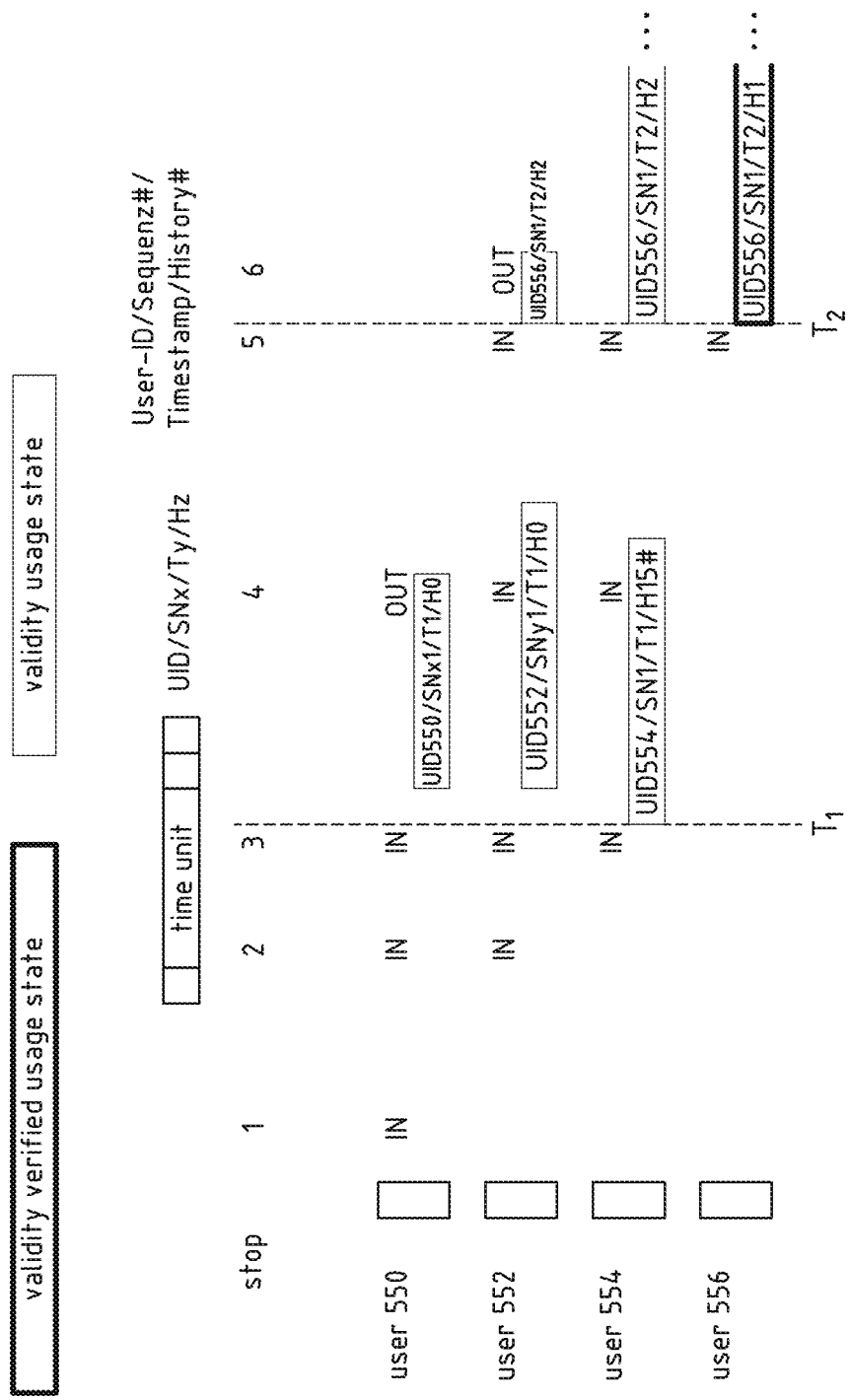
FIG. 5c is an exemplary further signal characteristic according to an exemplary further application in the scenario according to FIG. 5.

With regard to FIG. 5c, in order to avoid repetitions (again), essentially only the difference to the examples in FIGS. 5a-5b is described.

The first and second users 550, 552 enter into the vehicle 548 and the respective service applications each receive sensor data that meet the at least one basic usage reference criterion, i.e. are sufficient for a basic usage state (also called "system-be-in" state). The received sensor parameters are present but do not fulfill the at least one verification reference criterion. Therefore, the transmitting of advertising signals is not caused.

The third user 554 enters and the service application of the third user 554 receives sensor data which (also) do not fulfil the at least one basic usage reference criterion (e.g. after a detected check-in action), i.e. are not sufficient for a basic usage state ("system-be-in" state).

Therefore, the service application of the third user 554 queries the usage state of possible further users 550, 552 and service applications, respectively, with a request (UID554/SN1/T1/H15#). The mobile terminals of the first and second user 550, 552 receive the request (UID554/SN1/T1/H15#), and the respective service application causes a transmitting of a response (UID550/SNx1/T1/H0) and (UID552/Sny1/T1/H0), respectively, with the respective current state (presently basic usage state). The respective historical parameter H0 indicates that there is no verified usage state.

Based on the received responses, the third service application evaluates the responses and enters a basic usage state. At the next stop, the fourth user 556 enters with a service application in a verified usage state and causes a transmitting of an advertising message (as previously described).

Figure 6:
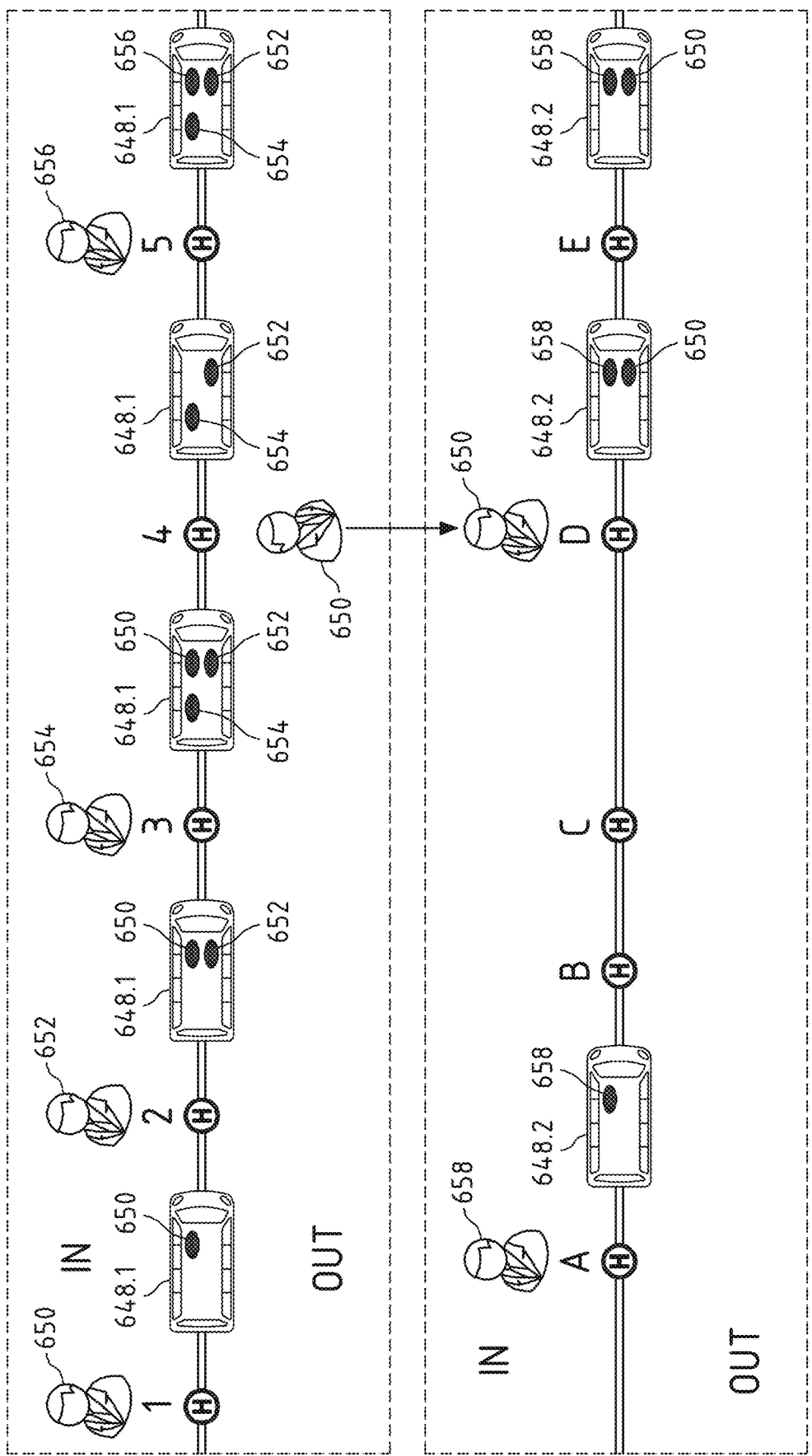
FIG. 6 is an additional schematic scenario of a transport service, in which an embodiment of a method according to the present application is applicable.

FIG. 6 shows a further schematic scenario of a transport service, in which an embodiment of a method according to the present application is applicable. In particular, the scenario in FIG. 5 is supplemented by a further vehicle 648.2, into which the first user 650 changes. In the further vehicle 648.2, a fifth user 658 has already entered at stop A.

With regard to the further details of FIG. 6, reference is made to FIG. 5 to avoid repetitions.

FIG. 6a shows exemplary signal characteristics of advertising signals according to an exemplary application in the scenario according to FIG. 6. To avoid repetitions, particular reference is made to the example according to FIG. 6a.

In contrast to this, the first user 650 changes from the first vehicle 648.1 to the second vehicle 648.2 at the stop 4 and D, respectively. In this second vehicle 648.2 there is already a fifth user 658 with a fifth service application in a verified usage state, so that even before the user 650 enters a transmission of a corresponding advertising signal containing an advertising message (UID658/SN2/T22/H1) is caused by the fifth service application.

The first service application evaluates the received advertising message (as described above) of the fifth user 658. The first service application comes to the conclusion that the received advertising message (UID658/SN2/T22/H1) is of higher value and then forwards the received advertising message (UID658/SN2/T22/H2).

In accordance with the application, the travel legitimation can be secured for the best possible reconstruction of the trips and/or prevention of an inappropriate "system-be-out". Terminals can be used like a vehicle infrastructure. An advertisement for terminals (e.g. Bluetooth or WiFi) can be made, in which relevant information regarding presence messages (e.g. system-be-in, time, location) is generated or passed on. In particular, a viral signal network formed by terminals can be used to enable a system-be-in without a vehicle infrastructure and without any present signals.

What is claimed is:

1. A method for operating a service application installed on a mobile terminal for the use of a service, in particular a transport service, comprising:
receiving, by a receiving module of the service application, at least one usage data set,
determining, in a basic usage state of the service application, by a verification module of the service application, a verified usage state based on the at least one received usage data set and at least one predetermined verification reference criterion,
if a verified usage state has been determined, causing, by a first transmitting module of the service application, a transmitting, by the mobile terminal, of an advertising signal with an advertising message, wherein the advertising message indicates that the service application has determined a verified usage state, and
generating, by a generating module of the service application, at least one usage log entry at least during the basic usage state about the usage of the service, and
causing, by a second transmitting module of the service application, a transmitting, by the mobile terminal, of a usage log message containing the at least one generated usage log entry to a backend system.

2. The method according to claim 1, wherein the advertising signal is a Bluetooth Low Energy advertising signal.

3. The method according to claim 1, wherein the advertising message comprises at least one of the following advertising parameters:
at least one user identifier,
at least one service provider identifier,
at least one time stamp,
at least one sequence number,
at least one historical date of the advertising signal,
at least one sensor flag characterizing at least one sensor element of the mobile terminal that transmits the advertising signal,
usage information verified by a backend system and/or an inspection device.

4. The method according to claim 1 further comprising:
detecting, by a detection module of the service application, a presence of the mobile terminal in a service area in a detection step, and
setting the service application to the basic usage state if the presence of the mobile terminal in the service area is detected,
wherein the detection step is performed in particular at specific times, in particular preferably on a regular basis.

5. The method according to claim 4, wherein the detecting of the presence of the mobile terminal in the service area comprises receiving at least one advertising signal with an advertising message transmitted by a further mobile terminal.

6. The method according to claim 5, wherein
in the detection step, the detecting of the presence of the mobile terminal in the service area comprises evaluating the at least one received advertising signal by performing at least one of the evaluating steps from the group comprising:
evaluating of the number of advertising signals received from the same further mobile terminal,
evaluating of the number of advertising signals transmitted from different further mobile terminals,
evaluating of the original time stamp of the at least one received advertising message,
evaluating of the at least one sensor flag,
evaluating of the at least one usage information verified by a backend system and/or an inspection device.

7. The method according to claim 1, wherein the received usage data set is at least one sensor data set of the mobile terminal received from a sensor element of the mobile terminal, and
the at least one received sensor data set:
is a signal level of a mobile radio network detected at a mobile radio interface of the mobile terminal,
and/or
is a geographical position detected by a position sensor of the mobile terminal,
and/or
is a signal level of a near field detected by a near field interface of the mobile terminal,
and/or
is an acceleration detected by an acceleration sensor of the mobile terminal,
and/or
is a speed detected by a speed sensor of the mobile terminal.

8. The method according to claim 1, wherein
the at least one received usage data set is a usage period indicating how long the service application has been in the basic usage state,
the at least one verification reference criterion is a specified minimum duration, and
the determining of the verified usage state comprises a detecting of an exceeding of the specified minimum duration by the usage period.

9. The method according to claim 1, wherein
the at least one received usage data set is usage information verified by a backend system and/or usage information verified by an inspection device,
the at least one verification reference criterion is the existence of verified usage information, and
the determining of the verified usage state comprises a detecting of the presence of the verified usage information.

10. The method according to claim 1, wherein
the at least one received usage data set is a sensor date of the mobile terminal received from a sensor element of the mobile terminal,
the evaluating of the at least one received sensor date comprises a comparing of the at least one sensor date with an associated and predetermined verification parameter range as a verification reference criterion,
wherein the verified usage state is detected if the received sensor date is within the verification parameter range.

11. The method according to claim 1 further comprising:
receiving a plurality of time-dependent sensor data comprising at least a mobile radio signal level and a position signal, the evaluating comprising a detecting of a drop of the plurality of time-dependent sensor data to substantially zero, and the at least one verification reference criterion is a drop of the plurality of time-dependent sensor data to substantially zero.

12. The method according to claim 1 further comprising:
causing, by the first transmitting module, a transmitting of a further advertising signal with a further advertising message upon receipt of a first advertising message,
wherein the further advertising message is at least partly based on the first advertising message.

13. The method according to claim 1, wherein the determining of the verified usage state is performed at specific times, in particular regularly.

14. The method according to claim 1 further comprising:
receiving, by at least one receiving module of the backend system, a plurality of usage log messages from a plurality of mobile terminals,
determining, by at least one evaluation module of the backend system of a first trip for a first mobile terminal having a verified usage state, based on at least one first usage log message of the first mobile terminal,
determining, by the at least one evaluation module of the backend system, a second trip for a second mobile terminal having a non-verified usage state, based on at least one second usage log message of the second mobile terminal containing at least one second usage log entry,
wherein the generating module of the service application of the second mobile terminal only generates the at least one second usage log entry when the second mobile terminal has received at least one advertising message from the first mobile terminal.

15. A service application, in particular in the form of a software application executable by a processor of a mobile terminal, for installation on a mobile terminal, comprising:
at least one receiving module configured to receive at least one usage data set,
at least one verification module configured to determine a verified usage state in a basic usage state of the service application based on the at least one received usage data set and at least one predetermined verification reference criterion, and
at least a first transmitting module configured to transmit, by the mobile terminal, an advertising signal with an advertising message if a verified usage state has been determined, wherein the advertising message indicates that the service application has determined a verified usage state,
generating, by a generating module of the service application, at least one usage log entry at least during the basic usage state about the usage of the service, and
causing, by a second transmitting module of the service application, a transmitting, by the mobile terminal of a usage log message containing the at least one generated usage log entry to a backend system.

16. A mobile terminal comprising at least one service application according to claim 15 installed on the mobile terminal.

17. A service system, in particular transport system, comprising:
at least one mobile terminal according to claim 16, and
at least one backend system.

18. A method for operating a service application installed on a mobile terminal for the use of a service, in particular a transport service, comprising:
receiving, by a receiving module of the service application, at least one usage data set,
determining, in a basic usage state of the service application, by a verification module of the service, a verified usage state based on the at least one received usage data set and at least one predetermined verification reference criterion,
if a verified usage state has been determined, causing, by a first transmitting module of the service application, a transmitting, by the mobile terminal, of an advertising signal with an advertising message, wherein the advertising message indicates that the service application has determined a verified usage state,
wherein the at least one received usage data set is a sensor date of the mobile terminal received from a sensor element of the mobile terminal,
wherein an evaluating of the at least one received sensor date comprises a comparing of the at least one sensor date with an associated and predetermined verification parameter range as a verification reference criterion, and
wherein the verified usage state is detected if the received sensor date is within the verification parameter range.

19. A method for operating a service application installed on a mobile terminal for the use of a service, in particular a transport service, comprising:
receiving, by a receiving module of the service application, at least one usage data set,
determining, in a basic usage state of the service application, by a verification module of the service application, a verified usage state based on the at least one received usage data set and at least one predetermined verification reference criterion,
if a verified usage state has been determined, causing, by a first transmitting module of the service application, a transmitting, by the mobile terminal, of an advertising signal with an advertising message, wherein the advertising message indicates that the service application has determined a verified usage state,
receiving a plurality of time-dependent sensor data comprising at least a mobile radio signal level and a position signal,
wherein an evaluating comprises a detecting of a drop of the plurality of time-dependent sensor data to substantially zero, and
wherein the at least one verification reference criterion is a drop of the plurality of time-dependent sensor data to substantially zero.

20. A service application, in particular in the form of a software application executable by a processor of a mobile terminal, for installation on a mobile terminal, comprising:
at least one receiving module configured to receive at least one usage data set,
at least one verification module configured to determine a verified usage state in a basic usage state of the service application based on the at least one received usage data set and at least one predetermined verification reference criterion, and
at least a first transmitting module configured to transmit, by the mobile terminal, an advertising signal with an advertising message if a verified usage state has been determined, wherein the advertising message indicates that the service application has determined a verified usage state,
wherein the at least one received usage data set is a sensor date of the mobile terminal received from a sensor element of the mobile terminal, wherein an evaluating of the at least one received sensor date comprises a comparing of the at least one sensor date with an associated and predetermined verification parameter range as a verification reference criterion, and wherein the verified usage state is detected if the received sensor date is within the verification parameter range.

21. A mobile terminal comprising at least one service application according to claim 20 installed on the mobile terminal.

22. A service system, in particular transport system, comprising:
    at least one mobile terminal according to claim 21, and
    at least one backend system.

23. A service application, in particular in the form of a software application executable by a processor of a mobile terminal, for installation on a mobile terminal, comprising:
    at least one receiving module configured to receive at least one usage data set,
    at least one verification module configured to determine a verified usage state in a basic usage state of the service application based on the at least one received usage data set and at least one predetermined verification reference criterion, and
    at least a first transmitting module configured to transmit, by the mobile terminal, an advertising signal with an advertising message if a verified usage state has been determined, wherein the advertising message indicates that the service application has determined a verified usage state,
    receiving a plurality of time-dependent sensor data comprising at least a mobile radio signal level and a position signal,
    wherein an evaluating comprises a detecting of a drop of the plurality of time-dependent sensor data to substantially zero, and
    the at least one verification reference criterion is a drop of the plurality of time-dependent sensor data to substantially zero.

24. A mobile terminal comprising at least one service application according to claim 23 installed on the mobile terminal.

25. A service system, in particular transport system, comprising:
    at least one mobile terminal according to claim 24, and
    at least one backend system.

\* \* \* \* \*